United States Patent
Behara et al.

(10) Patent No.: US 11,819,758 B2
(45) Date of Patent: Nov. 21, 2023

(54) SYNCHRONIZATION OF ONLINE GAMING ENVIRONMENT WITH VIDEO STREAMING OF A LIVE EVENT

(71) Applicant: Novi Digital Entertainment Private Limited, Mumbai (IN)

(72) Inventors: Aniket Behara, Mumbai (IN); Kshitij Gupta, Mumbai (IN); Jayesh Sidhwani, Mumbai (IN); Akash Saxena, Mumbai (IN); Varun Narang, Mumbai (IN); Nikhil Soman, Mumbai (IN)

(73) Assignee: NOVI DIGITAL ENTERTAINMENT PRIVATE LIMITED, Mumbai (IN)

( * ) Notice: Subject to any disclaimer, the term of this patent is extended or adjusted under 35 U.S.C. 154(b) by 133 days.

(21) Appl. No.: 17/045,664

(22) PCT Filed: Apr. 5, 2019

(86) PCT No.: PCT/IN2019/050282
§ 371 (c)(1),
(2) Date: Oct. 6, 2020

(87) PCT Pub. No.: WO2019/193610
PCT Pub. Date: Oct. 10, 2019

(65) Prior Publication Data
US 2021/0154575 A1    May 27, 2021

(30) Foreign Application Priority Data

Apr. 6, 2018 (IN) .............................. 201821013325

(51) Int. Cl.
*H04N 21/2187* (2011.01)
*H04N 21/2385* (2011.01)
(Continued)

(52) U.S. Cl.
CPC ....... *A63F 13/355* (2014.09); *H04N 21/2187* (2013.01); *H04N 21/2385* (2013.01);
(Continued)

(58) Field of Classification Search
CPC ........... H04N 21/2187; H04N 21/2385; H04N 21/242
See application file for complete search history.

(56) References Cited

U.S. PATENT DOCUMENTS 6,080,063 A    6/2000  Khosla
8,858,313 B1  10/2014  Selfors
(Continued)

OTHER PUBLICATIONS

Miller, "5 Ways to Pick a Winner for Your Online Contest." In: ShortStack, Dated Oct. 20, 2017, from <https://www.shortstack.com/blog/5-ways-to-pick-a winner-for-your-online-contest/>, 10 pages.
(Continued)

*Primary Examiner* — Kyu Chae (57) ABSTRACT

The embodiments of the present invention disclose synchronization of an online gaming environment with video streaming of at least one live event. A gaming application is configured to be executed on each of a plurality of user devices, simultaneously with the video being streamed. At least one instantaneous question is generated based on at least one action of the live event. Both the video and the instantaneous question are displayed in-sync with the live event video. The server also synchronizes an answer of the at least one instantaneous question with a next instantaneous question and also with the video being streamed, such that the answer, the video, and the next instantaneous question are displayed in-sync on at least one of the plurality of user devices.

21 Claims, 4 Drawing Sheets

(51) Int. Cl.
   *H04N 21/242*   (2011.01)
   *H04N 21/258*   (2011.01)
   *H04N 21/43*    (2011.01)
   *H04N 21/44*    (2011.01)
   *A63F 13/355*   (2014.01)

(52) U.S. Cl.
   CPC ..... *H04N 21/242* (2013.01); *H04N 21/25841* (2013.01); *H04N 21/4302* (2013.01); *H04N 21/44* (2013.01)

(56) References Cited

U.S. PATENT DOCUMENTS

| | | | | |
|---|---|---|---|---|
| 9,998,796 | B1* | 6/2018 | Kedenburg, III | H04N 21/2187 |
| 10,971,026 | B1* | 4/2021 | Norkaitis | G09B 7/08 |
| 2002/0133562 | A1* | 9/2002 | Newnam | G06Q 30/02 |
| | | | | 709/216 |
| 2003/0037156 | A1 | 2/2003 | Mallart | |
| 2006/0068818 | A1* | 3/2006 | Leitersdorf | H04N 21/6131 |
| | | | | 348/E7.071 |
| 2008/0242409 | A1 | 10/2008 | Schueller | |
| 2008/0313027 | A1* | 12/2008 | Jain | G06Q 30/0212 |
| | | | | 705/37 |
| 2013/0079093 | A1 | 3/2013 | Lockton et al. | |
| 2014/0155134 | A1* | 6/2014 | Lockton | H04L 65/4015 |
| | | | | 463/31 |
| 2015/0347415 | A1* | 12/2015 | Pantos | H04N 21/854 |
| | | | | 707/738 |
| 2016/0346695 | A1* | 12/2016 | Hoory | A63F 13/65 |
| 2018/0352274 | A1* | 12/2018 | Pantos | H04N 21/8456 |

OTHER PUBLICATIONS

International Search Report and Written Opinion dated Oct. 7, 2019 for PCT Application No. PCT/IN2019/050282, 10 pages.

* cited by examiner

_SYNCHRONIZATION OF ONLINE GAMING ENVIRONMENT WITH VIDEO STREAMING OF A LIVE EVENT_

CROSS REFERENCE TO RELATED APPLICATIONS

This application is a U.S. National Stage application of International Patent Application No. PCT/IN2019/050282, filed on Apr. 5, 2019, which claims priority to Indian Patent Application No. 201821013325, filed on Apr. 6, 2018, the contents of which are incorporated herein by reference in their entirety.

TECHNICAL FIELD

The present invention relates generally to online gaming and more particularly, embodiments of the present invention relate to providing online gaming environment based on video streaming of a live event and its synchronization thereof.

BACKGROUND

Various gaming platforms are available that facilitate users to play video games using various electronic devices such as television sets, mobile devices, smartphones, personal digital assistants, laptops, tablets, etc. Online gaming applications have been very popular in the recent years, wherein the users via their electronic devices, are connected to one or more servers for playing the online games. Also, these games are interactive that involve participation of multiple users in real-time.

With advent of data streaming, it has become possible to stream audio and video data from a remote server to various electronics devices within a network. The data streaming technology is also used to stream audio and/or video of any live event in real-time for a large number of audiences/viewers located at various geographical locations. Of lately, online gaming applications are being developed based on real-world events and scenarios happening in the real-time, such as sports matches, live concerts etcetera. Such online gaming applications require participation of a large number of users who play the game on their respective devices.

One of the problems associated with online gaming environment based on the real-world events, is the transmission latency wherein the streamed data is not received at the same time on the devices connected within the network. This is due to the fact that the various electronic devices that are connected to the gaming server, may not be registered to a single service provider. There may be different service providers providing their services via various means including satellite networks, local cable networks, mobile service networks etc. Also, these service providers generally operate under different bandwidths as set by the regulatory authorities. In such a situation, there is a possibility that the gaming data pertaining to a particular action of the real-time event may not reach in synch with the video of the real-time event being streamed on the electronic devices.

The existing systems and methods provide network-based games that use RTMP and RTSP protocols for streaming data and video components of a game. However, the existing systems and methods fail to efficiently eliminate the delays between data and video being transmitted. As a result, the delays in video streaming are observed by the gamer on his/her gaming device screen as the video being hanging or being jerky.

Also, the garners may experience different time delays when attending a game live and while watching the game live on television or via Internet. This interrupts users/garners enjoyment and hence to ensure fairness to all participants/garners, the delays must be neutralized.

In view of the problem mentioned above, there is a need to provide synchronization between the transmission of real-time data being streamed to the electronic devices, and the gaming application data that are based on the real-time event being live-streamed.

SUMMARY

This section is provided to introduce certain aspects of the present invention in a simplified form that are further described below in the detailed description. This summary is not intended to identify the key features or the scope of the claimed subject matter.

In view of the afore-mentioned drawbacks and limitations of the prior art, it is an object of the present invention to provide a system and method of interactive gaming environment that are based on real-world scenarios happening in the real-time.

Yet another objective of the present invention is to provide synchronization of real-time gaming environment with real-time video data streaming in multiple electronic devices used by multiple users at multiple locations.

In view of these and other objects, one aspect of the present invention may relate to a method for a method for providing synchronization in an online gaming environment with video streaming of at least one live event. The method comprises the steps of: configuring a gaming application based on the at least one live event, the gaming application being executed on a plurality of user devices [110] located at a plurality of geographical locations; configuring the gaming application on the plurality of user devices [110] to stream, via a server [106], the video of at least one live event, wherein the video is received on the plurality of user devices [110] by a corresponding time delay; generating at least one instantaneous question based on at least one action occurring in the at least one live event; synchronizing, based on the corresponding time delay, the at least one instantaneous question with the video being streamed on the plurality of user devices [110], such that both the video and the at least one instantaneous question are displayed in-sync on the plurality of user devices [110]; and synchronizing, based on the corresponding time delay, an answer of the at least one instantaneous question with a next instantaneous question and with the video being streamed on the plurality of user devices [110], such that the answer, the video, and the next instantaneous question are displayed in-sync on at least one of the plurality of user devices [110].

Another aspect of the invention may relate to a system [100] for providing synchronization in an online gaming environment with video streaming of at least one live event. The system [100] comprises a plurality of user devices [110] located at a plurality of geographical locations, wherein each of the plurality of user devices [110] executes a gaming application that is configured based on the at streaming of at least one live event through the gaming application. The gaming application is executed simultaneously with the video streaming of the live event. The system [100] further comprises a server [106] configured to: stream the video of at least one live event on each of the plurality of user devices [110], wherein the video is received on the plurality of user device [110] by a corresponding time delay. The server [106] is further configured to generate at least one instantaneous question based on at least one action occurring in the at least one live event. The server [106] further synchronizes, based on the corresponding time delay, the at least one instantaneous question with the video being streamed on the plurality of user devices [110], such that both the video and the at least one instantaneous question are displayed in-sync on at least one of the plurality of user devices [110]. The server [106] also synchronizes, based on the corresponding time delay, an answer of the at least one instantaneous question with a next instantaneous question and with the video being streamed on the plurality of user devices [110], such that the answer, the video, and the next instantaneous question are displayed in-sync on at least one of the plurality of user devices [110]. A database [108] configured in communication with the server [106] is also provided for storing the data pertaining to: the gaming application, and at least one action occurring in the at least one live event.

In various embodiments of the present invention, the at least one instantaneous question is an interactive multiple-choice question for which any choice may be selected and submitted to the server [106] by the plurality of user devices [110]. The submitted choice is rejected by the server [106] if it is received beyond a predefined time window. The submitted choice when received within the predefined time window, is compared with the answer of the at least one instantaneous question for determining correctness of the submitted choice. Further, a leader board is generated by computing ranks of respective users of the plurality of user devices [110], the ranks being computed based on total number of correct submitted choices by the corresponding user device [110]. At least one winner is selected from the leader board by using a randomization technique.

In the embodiments of the present invention, the time delay is dependent upon multiple factors including: geographical location of the plurality of user devices [110], and bandwidth allocated to a corresponding service provider to which any of the plurality of user devices [110] is subscribed for receiving the video streaming of at least one live event.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components. The connections between the sub-components of a component may not have been shown in the drawings for the sake of clarity, therefore, all sub-components shall be assumed to be connected to each other unless explicitly otherwise stated in the disclosure herein.

DETAILED DESCRIPTION

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address any of the problems discussed above or might address only one of the problems discussed above.

The present invention encompasses systems and methods for providing synchronization of an online gaming environment with video streaming of at least one live event. The gaming application is based on the live event and is executed simultaneously with the video of the live event, even in a scenario when the video is being received at a different time on the different user devices [110] due to any transmission delay or latency. Thus, the present invention encompasses methods and systems for allowing a user to watch on the screen, the live video of any event in the real-time. Simultaneously, the user is facilitated to play an interactive game that is based on the real time event being streamed on the user device [110] over a network.

As used herein, "hardware" includes a combination of discrete components, an integrated circuit, an application specific integrated circuit, a field programmable gate array, other programmable logic devices and/or other suitable hardware as may be obvious to a person skilled in the art.

As used herein, "software" includes one or more objects, agents, threads, lines of code, subroutines, separate software applications, or other suitable software structures as may be obvious to a skilled person. In one embodiment, software can include one or more lines of code or other suitable software structures operating in a general-purpose software application, such as an operating system, and one or more lines of code or other suitable software structures operating in a specific purpose software application.

As used herein, the "gaming applications" are the software applications residing in the user electronic devices/user devices and can include a web-based application and a mobile application. The gaming applications may be installed or downloaded from a web server to the user devices. The user devices may be connected to the server via a communication network. The gaming application may be communicably coupled to other applications including, but not limited to, contact management application, calendar application, messaging applications, image and/or video modification and viewing applications, navigational applications, office applications, business applications, educational applications, health and fitness applications, medical applications, financial applications, social networking applications, and any other application. The application uses "data" that can be created, modified or installed in an electronic device over time. The data includes, but is not limited to, contacts, calendar entries, call logs, gaming data logs, SMS, images, videos, factory data, and any other data associated with the gaming applications.

As used herein, "couple" and its cognate terms, such as "couples" and "coupled" includes a physical connection (such as a conductor), a virtual connection (such as through randomly assigned memory locations of data memory device), a logical connection (such as through logical gates of semiconducting device), other suitable connections, or a combination of such connections, as may be obvious to a skilled person.

As used herein, "user device" includes, but is not limited to, a mobile phone, smart phone, set-top boxes, smart television, laptop, a general-purpose computer, desktop, personal digital assistant, tablet computer, mainframe computer, or any other computing device as may be obvious to a person skilled in the art.

Embodiments of the present disclosure will now be discussed with details of the structural and functional features of the system and the method thereof.

Figure 1:
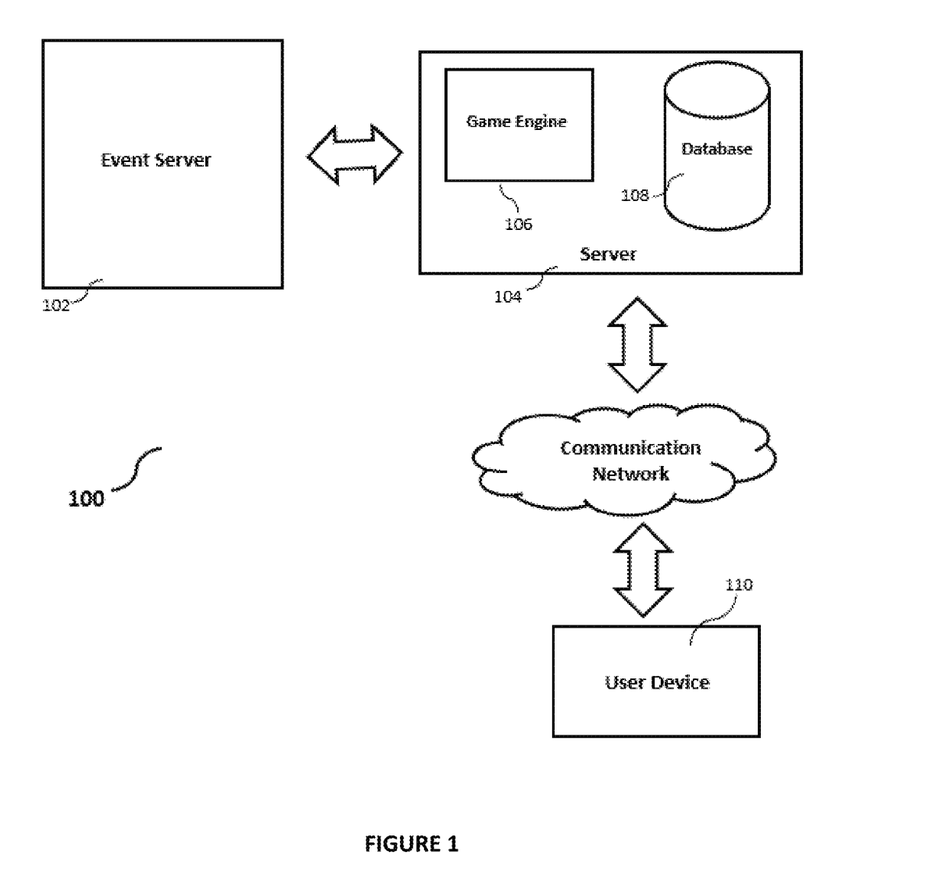
FIG. 1 illustrates a system [100] architecture for providing synchronization in an online gaming environment with video streaming of at least one live event, in accordance with exemplary embodiments of the present disclosure.

FIG. 1 illustrates a system architecture [100] for providing synchronization in an online gaming environment with video streaming of at least one live event, in accordance with exemplary embodiments of the present disclosure. As shown in FIG. 1, the system [100] comprises an event server [102] communicably coupled to a server [104] associated with a game engine [106] and a database [108]. The server is further communicably coupled to a plurality of user devices [110] across a communication network. The system [100] is configured to provide synchronization in an online gaming environment with live video being streamed on the plurality of user devices [110].

In an embodiment of the invention, the plurality of user devices [110] is located at a plurality of geographical locations. At least one interactive gaming application is configured by the server [106] using the game engine [106], based on the at least on live event happening in the real-time. The live event may include a sports match, a concert, competition events etc. The video of the live event is streamed, via the event server [102], on the plurality of the user devices [110] over the communication network. The at least one gaming application is configured to be executed on the plurality of user devices [110] such that the users or the participants may play the interactive game. Various security controls may be provided to ensure that only authorized users may participate in the interactive game via their respective user devices [110].

Further, the event server [102] is communicably connected to the server [106] for facilitating synchronization of the live video and the gaming application. The gaming application is executed simultaneously with the video streaming of the live event. The video is received on the plurality of user devices [110] by a corresponding time delay as compared to the real transmission time of the event server [102] due to the fact that the said corresponding time-delay may be systematically and arbitrarily imposed by the government authority. Therefore, different user devices [110] subscribed to different service providers, may receive the video by a time-delay as allowed by the authority.

The server [106] is further configured to generate at least one instantaneous question based on at least one action occurring in the at least one live event. The instantaneous questions are based on the live action of the at least one event such as a sports match, e.g. Cricket. In one embodiment of the present invention, the instantaneous questions are multiple-choice questions (MCQs) that require an option to be selected by the user while using the gaming application. The at least one instantaneous question is synchronized with the video being streamed on the plurality of user devices [110], such that both the video and the at least one instantaneous question are displayed in-sync on at least one of the plurality of user devices [110].

In an embodiment of the present invention, a corresponding answer of each of the instantaneous questions is generated by the server [106] and transmitted to the at least one user device [110]. The answer of a previous instantaneous question is transmitted along with the next instantaneous question to the at least one user device [110] in synchronization with each other. In other words, based on the corresponding time delay, the next instantaneous question is synchronized with the video being streamed on the plurality of user devices [110] and also with the answer of the previous question that was sent at the previous instant. This process of synchronization as described above, enables the user device [110] to receive simultaneously the answer of previous instantaneous question, next instantaneous question and the video of the live event. Therefore, the video, the question of the current instant, and the answer of a previous question, are displayed in-sync on at least one of the plurality of user devices [110] despite the delay of transmission.

In one embodiment of the present invention, the real time video data streaming, also termed as 'feed', may be transmitted by the event server [102] at a very high speed, to the server [106] for rendering multiple-choice instantaneous questions. The event server [102] may be a third party server that transmits the feed so that the instantaneous question may be generated at the right instant by the server [106]. The MCQs may include trivia questions or prediction questions. For example, if a cricket match is being played in the real world in real time, then a prediction question may be asked as 'What is the outcome of this upcoming ball?'. This question must reach the user device [110] while the bowler is still bowling the ball and not after the ball is hit or missed by the batsman. Thereafter, the multiple choices as shown on the screen of the user device [110], are required to be selected by the player/user. The users or players via their respective user device [110] interface, select and submit their choice as their response to the question. The users are required to submit their selected choice within a predefined time window to gain scores. If a user does not select and submit his/her choice the within the predefined time window, then it may be rejected by the server [106]. In such a scenario, the user may lose a score. According to the embodiments of the present invention, the predefined time window is an interval of time and is measured in seconds. The users are then provided with the next instantaneous question and are required to submit their next response again within the predefined time. This goes on for the full event, till a winner is decided by the system [100]. The process of deciding a winner is based upon the high scores obtained by the users while playing the interactive game on their respective user device [110]. In an embodiment of the present invention, the choice submitted by the user is compared with the corresponding correct answer of the at least one instantaneous question, wherein the correct answer is generated and sent by the server [106] to the at least one user device [110]. The submitted choice is compared or mapped with the answer received by the user device [110] to determine the correctness of the submitted choice. Subsequently, a score is added to the user's account or user's profile for each correct response submitted by the user and the users who gain the highest scores, qualify to be selected as a winner by using the randomization technique.

In an embodiment of the present invention, the server [106] is configured to use HTTP based mechanism for any live event's video streaming. The HTTP based process allows different user devices [110] or the clients to use different bandwidth and potentially be ahead/behind of rest of viewers. Any out-of-sync nature of HTTP based streaming may create a problem for "Watch-and-Play" type of games where a question should be answered within the defined window. Therefore, the embodiments of the present invention encompass insertion of program date time (PDT) extension in the HLS (HTTP Live Streaming) manifest of the stream, wherein the HLS manifest is a 'text' file with comments, HLS commands, and list of links for video transport segment. The PDT is refreshed after every interval of a predefined time period (in seconds) so that any user who, using his/her user device, joins in between the ongoing match/game, can get the instantaneous information of the ongoing live event. This facilitates in synchronization of the video of live event with the gaming environment. This also facilitates the user to login and thereafter play the game and participate in the interactions any time while the game is on. The users therefore do not need to always login at the start of the online game, and can join at any instant before the game ends.

The addition of the PDT extension can be better explained with the following example of live streaming of an event like a live cricket match.

For example, in an ideal condition of NO DELAY during a live streaming of a cricket match on the user device [110], if the time when the actual 'run-up' of a bowler starts at "XX:00:00 time, the MCQ instantaneous question can be asked by the server [106] to the user device [110] at XX:00:00 time. If this time is inserted in the HLS manifest and since it is the ideal condition of "NO DELAY" between the ball being bowled and its video being streamed on the user device [110], then the user device [110] can display the corresponding question when the ball is bowled and allow users to send answers till XX:00:10 time (by assuming that a time of 10 seconds is taken for the ball to be released).

However, the ideal scenario may not take place and there might occur a certain delay in streaming the video to the user devices [110]. As a result, the user device [110] may not get the XX:00:00 event (i.e. the run-up start) till a couple of seconds later and actually receives the video stream of that action at XX:00:10 or XX:00:15 time. This is solved by facilitating the user device [110] to calculate the difference between stream time (noted by PDT) and the local time of the device. This difference or offset can then be utilize to calibrate all actions of the live event subsequently. For instance, a run-up start at XX:00:00 will imply that the question will be shown at XX:00:10, a ball getting released at XX:00:10 can accordingly be mapped to timestamp XX:00:20 where the predefined window to submit the answer closes. Based on the corresponding time delay (i.e. 10 or 15 seconds in this example), an answer of the previous instantaneous question is synched with a next instantaneous question while the video of that instant is being streamed on the user devices [110], such that the answer, the video, and the next instantaneous question are displayed in-sync on at least one of the plurality of user devices [110].

In the real-world scenario, the PDT is generated by a transcoder and the time of the various actions such as run-up start, ball release of an event like cricket match, are marked by humans. This may result in error if the PDT is not calibrated against the local time of the user device [110] and adjust the event action times accordingly. The embodiment of the present invention encompasses facilitating the calibration of the PDT according to the local time set at the user device [110] end. For example: a ball being bowed at XX:00:00 (PDT) and showing up at XX:00:20 at the users device. The user device [110] accordingly adjusts their event time down by 20 seconds.

In one embodiment of the present invention, the database [108] may be configured to store customer/user profile information. The user profile information includes user name, mobile/contact number, email id, user device [110] id, user record creation date/time information etc. the database [108] is configured in communication with the server [106] and is also provided for storing the data pertaining to the gaming application, and at least one action occurring in the at least one live event.

Figure 2:
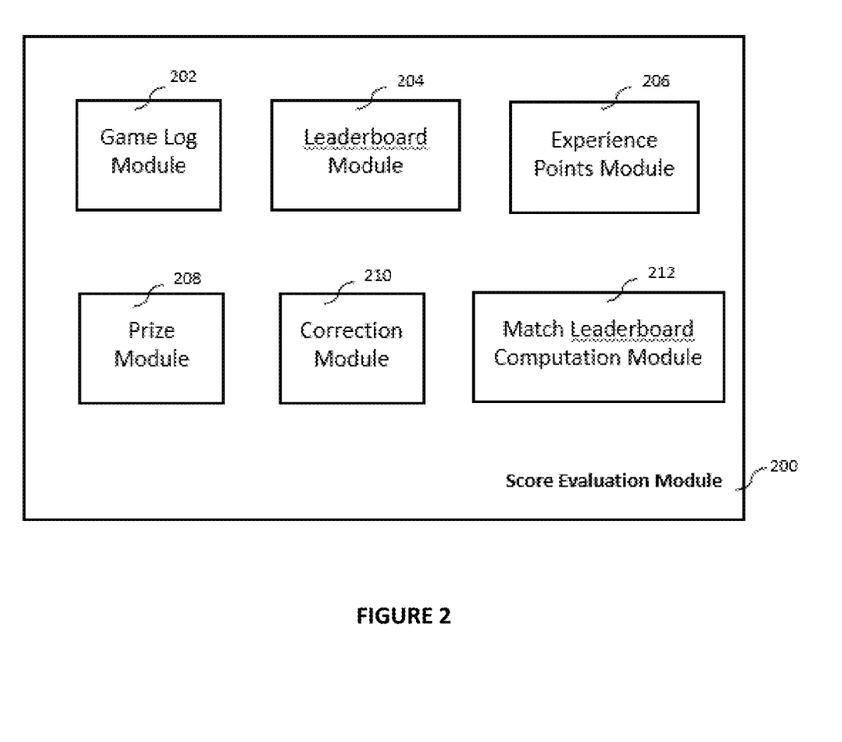
FIG. 2 illustrate various modules for evaluation of scores obtained by the users participating in the game based on the live event, in accordance with exemplary embodiments of the present disclosure.

FIG. 2 illustrates various modules for evaluation of scores obtained by the users participating in the game based on the live event, in accordance with exemplary embodiments of the present disclosure. The various modules receive inputs and provide various respective functionalities that enable the evaluation of players' scores and determining a winner amongst the players. These modules are described as follows:

Game Log module [202]—This maintains a game log of all user interactions and activity while participating in the online game. The game log includes the history of users activities between the user login time and logout time for a given game.

Leaderboard Module [204]—This module provides scoreboard for each game being played. The leaderboard module maintains the scoreboard based on the highest number of correct answers received from various users via their user device [110]s. The score board is refreshed each time a player or the user submits a correct answer to the instantaneous question received by the user device [110]. Thus, the leaderboard is a "per-match leaderboard" and the leaderboard data is re-computed each time after a question is "closed", i.e. the time window for that instantaneous question is exhausted.

Experience Points Module [206]—This module maintains the overall points earned by a user by the respective device so far.

Prize Module [208]—This module provides alerts and notifications to the users via their respective user devices [110], in the event of winning a game while maintaining the real time nature of the event, such as a cricket match. The users may further be facilitated for redeeming a prize once they are notified that they have won a game.

Correction Module [210]—In addition, present invention encompasses methods and systems for auditing log of game tick information received from the third-party server. Further, in a typical scenario there may be corrections required, and can be multiple records for a particular question asked by the server [106] to the player device. For example, there might be situations where an earlier answer might need correction due to a variety of reasons including human errors, no balls etc. therefore, when any error happens, a correction answer is received by the game engine [106] from the third-party server and the game engine [106] awards two groups of players with points. In this case, the local, client leaderboard will be behind, however, the server scores will always be accurate. Client scores are refreshed if the application installed on the user device [110] is restarted.

Match Leaderboard Computation Module [212]—Furthermore, the present invention encompasses the features of fastest confirmation of the leaderboard to identify the winner at any instant of a game being played by the user. The Match Leaderboard Computation Module facilitates the users to in getting on the leaderboard as soon as they submit their first correct answer to any instantaneous question. This module fairly determine the winner of the game by using the randomization function, as compared to the existing randomization techniques that compute the leaderboard after the entire game is completed and all questions have been answered by the users who are participating in the game. According to the embodiments of the present invention, once the users have submitted their first correct choice in response to an instantaneous question, they establish their player match position. In the event of a tie, the player match position is used as a tie-break randomization function. The player match position is a rank of the player/user that is established afresh every game the user plays. Since the number of users participating in the interactive game based on a live event is typically very large and varying, the determination of player's rank is a random function of variability of the event actions that the users watch on their screen. The random UserID or DeviceID may be selected for determining a winner and neither party (i.e. the user device or the server) may have any control in such selection procedure, and may vary depending upon the varying number of the users participating in a game. The player match position can potentially change after each scoring round, given a third layer of randomization using the user deviceID as a shuffle function. Every new game will obtain a new player match position for the same user.

Further, a tournament leaderboard is also computed by evaluating the scores of all prior match winning leaderboards which are immutably stored and available with the auditors. The auditors perform the evaluation and declare the winner.

In one embodiment of the present invention, game rank is awarded to the users playing the game. The game rank is a sort function of match score and player match position, which is used in the event of a tie-break. For example, a tie-break may occur between the users in the event of all users having the same score at a given time, or in the event of all users answering only one question. The tie-break is therefore always the player match position.

The system [100] is also communicably associated with a database [108] or a repository [108] configured to store the data and information pertaining to gaming application in accordance with the present invention.

Figure 3:
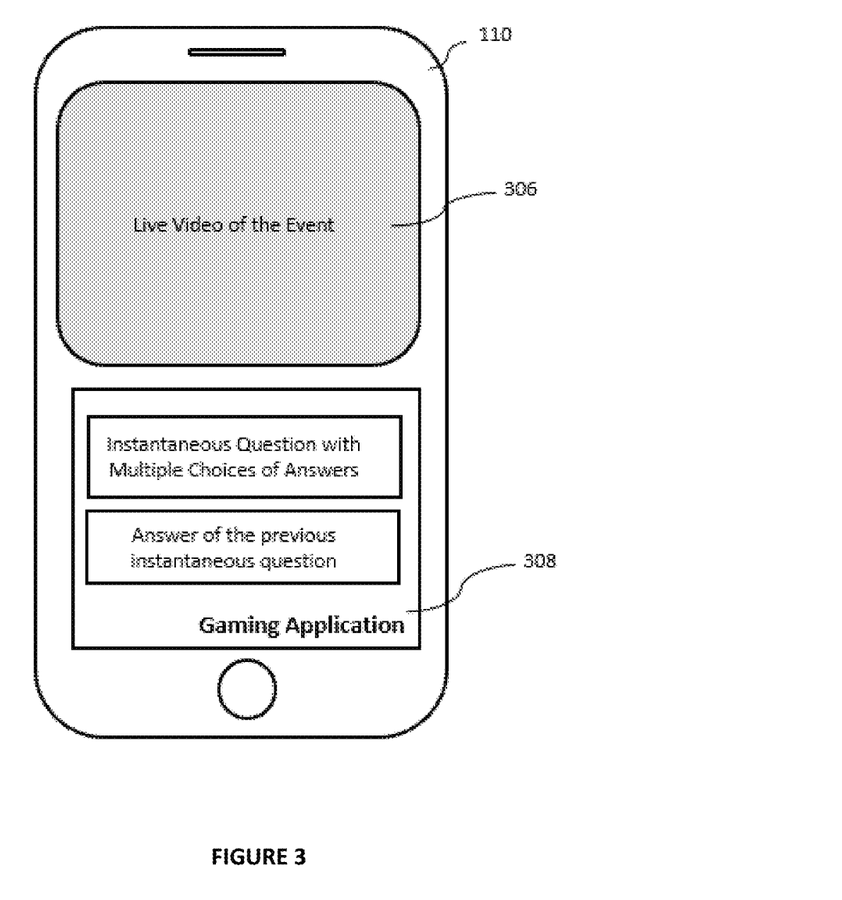
FIG. 3 illustrates the synchronization of gaming environment with the live event video being streamed on at least one user device [110], in accordance with exemplary embodiments of the present disclosure.

FIG. 3 illustrates the synchronization of execution of gaming application [308] with the live event video being streamed on at least one user device [110], in accordance with exemplary embodiments of the present disclosure. As explained above, the server [106] is communicably coupled with the plurality of user devices [110] to transmit the video [306] of the live event, such as live cricket match, by streaming the video data to the devices. The server [106] is configured to generate the instantaneous questions based on various actions occurring in the at least one live event. As shown in the figure, despite different delays occurring on each of the device, a question generated for a particular action of the event, at any instant, is delivered in synch with the video [306] of that action to each of the device. Thus, both the video [306] and the at least one instantaneous question are displayed in-sync on each of the plurality of user devices [110].

Further, the answer of the at least one instantaneous question is synchronized with the next instantaneous question and also with the video [306] being streamed on the plurality of user devices [110], such that the answer, the video [306], and the next instantaneous question are displayed in-sync on at least one of the plurality of user devices [110].

The modules and features of the system [100] as described above may be associated with at least one processor configured to perform data processing, input/output processing, and/or any other functionality that enables the working of the system [100] in accordance with the present disclosure. As used herein, a "processor" refers to any logic circuitry for processing instructions. A processor may be a special purpose processor or plurality of microprocessors, wherein one or more microprocessors may be associated with at least one controller, a microcontroller, Application Specific Integrated Circuits (ASICs), Field Programmable Gate Array (FPGAs) circuits, and any other type of integrated circuit (IC), etc. The at least one processor may also a processor at a remote location that processes the method steps as explained in present disclosure. Among other capabilities, the processor is also configured to fetch and execute computer-readable instructions and data stored in a memory or a data storage device.

According to the embodiments of the present invention, the database [108] or a repository may be implemented using a memory, any external storage device, an internal storage device that may be configured in communication with the user device [110] for storing the metadata. The memory may also store instructions to be executed, any information, and data, used by the system [100] to implement the synchronization of the gaming environment with video streaming of at least one live event. As used herein, a "memory" or "repository" refers to any non-transitory media that stores data and/or instructions that cause a machine to operate in a specific manner. The memory may include a volatile memory or a non-volatile memory. Non-volatile memory includes, for example, magnetic disk, optical disk, solid state drives, or any other storage device for storing information and instructions. Volatile memory includes, for example, a dynamic memory. The memory may be a single or multiple, coupled or independent, and encompasses other variations and options of implementation as may be obvious to a person skilled in the art.

The processor, memory, and the system [100] are interconnected to each other, for example, using a communication bus. The "communication bus" or a "bus" includes hardware, software and communication protocol used by the bus to facilitate transfer of data and/or instructions. The communication bus facilitates transfer of data, information and content between these components.

The one or more user devices [110] may operate on the same or different operating systems including the Android OS, the Apple iOS, Blackberry OS, Symbian, Web OS, Windows Phone OS, etc.

In an exemplary embodiment, the system [100] comprises an authentication module for providing authentication of the requests received from the user devices [110]. The server [106] sets limit policies for the incoming requests and provides one of: the validation and invalidation of the received requests. The authentication module authenticates the validated requests for determining and thereafter preventing any malicious requests to enter into the at least one part of the server [106] for execution of the gaming application. Thus, the incoming requests are further filtered by the authentication module which allows only the authorized requests to be sent to the server [106] for execution. The authentication module authorizes the received requests based on various parameters such as userID, deviceID and any permanent ID that may be provided by the server [106].

In one embodiment herein, the authentication module checks and matches the credentials of the user devices [110] with the pre-stored credentials for providing authentication. The authentication module is associated with the database [108] or repository to store and retrieve the data pertaining to the authentication processes.

FIG. 3 illustrates a method for providing synchronization in an online gaming environment with video streaming of at least one live event, in accordance with exemplary embodiments of the present disclosure.

Figure 4:
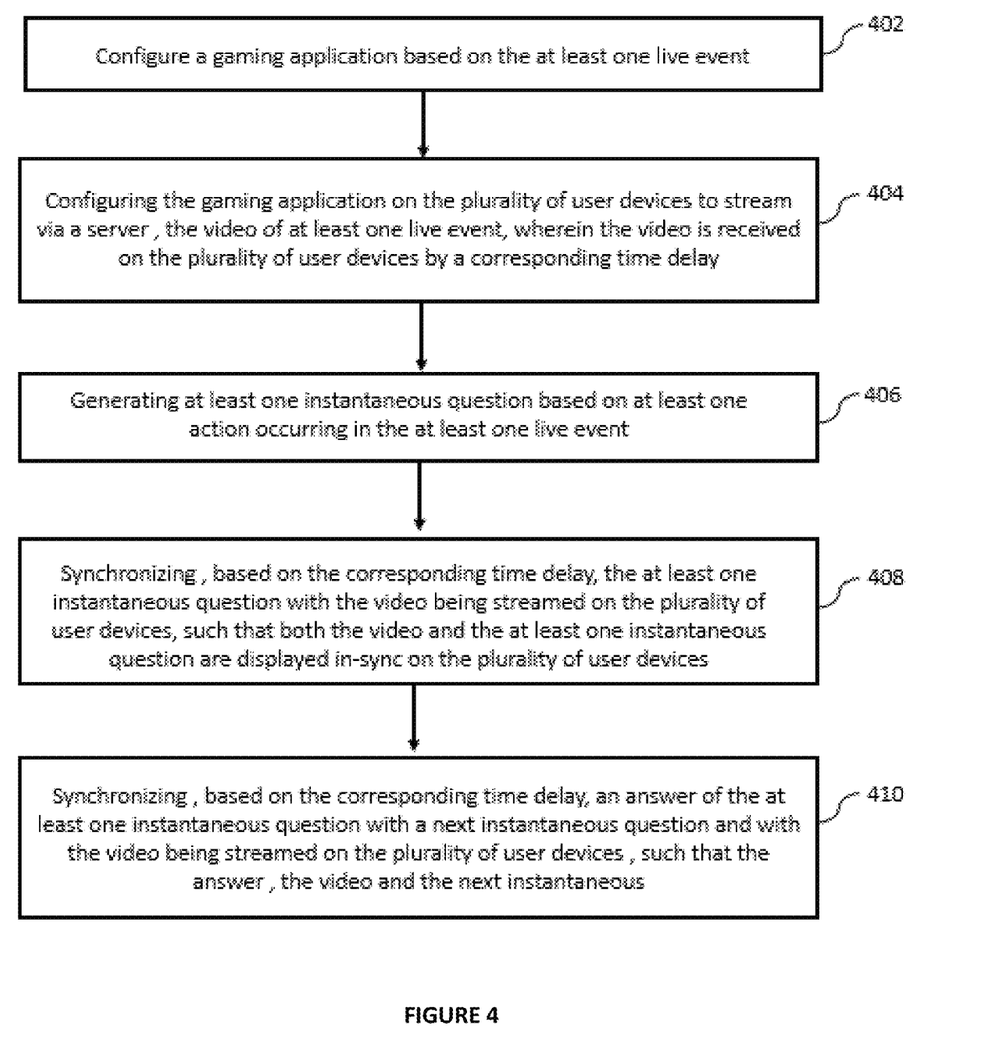
FIG. 4 illustrates a method for providing synchronization in an online gaming environment with video streaming of at least one live event, in accordance with exemplary embodiments of the present disclosure.

At step 402, the gaming application is configured based on the at least one live event happening in the real world, such as a Cricket match. The gaming application is configured using a server [106] communicably connected to the plurality of user devices [110]. The configured gaming application can be executed on the plurality of user devices [110] that are located at a plurality of geographical locations.

At step 404, the gaming application on the plurality of user devices [110] to stream, via the server [106], the video of the at least one live event. The video is received on the plurality of user devices [110] by a corresponding time delay, as per the authorized standards set by the government bodies.

At step 406, at least one instantaneous question is generated based on at least one action occurring in the at least one live event.

At step 408, based on the corresponding time delay, the at least one instantaneous question is synchronized with the video being streamed on the plurality of user devices [110], such that both the video and the at least one instantaneous question are displayed in-sync on the plurality of user devices [110].

At step 410, based on the corresponding time delay, an answer of the at least one instantaneous question is synchronized with a next instantaneous question and also with the video being streamed on the plurality of user devices [110], such that the answer, the video, and the next instantaneous question are displayed in-sync on at least one of the plurality of user devices [110].

While considerable emphasis has been placed herein on the disclosed embodiments, it will be appreciated that changes can be made to the embodiments without departing from the principles of the present invention. These and other changes in the embodiments of the present invention shall be within the scope of the present invention and it is to be understood that the foregoing descriptive matter is illustrative and non-limiting.

We claim:

1. A method for providing synchronization in an online gaming environment with video streaming of at least one live event, the method comprising the steps of:
    configuring a gaming application based on the at least one live event, the gaming application being executed on a plurality of user devices located at a plurality of geographical locations;
    configuring the gaming application on the plurality of user devices to receive a video stream of the at least one live event, via a server, wherein the video stream is received on the plurality of user devices by a corresponding time delay;
    generating at least one instantaneous question based on at least one action occurring in the video stream of the at least one live event;
    synchronizing, based on the corresponding time delay, the at least one instantaneous question with the video stream on the plurality of user devices, such that both the video stream and the at least one instantaneous question are displayed in-sync, wherein a program date time (PDT) extension is inserted in HLS (HTTP Live Streaming) manifest of the video stream for facilitating the synchronization of the video stream with the online gaming environment, and wherein the inserted PDT extension is dynamically and periodically refreshable; and
    synchronizing, based on the corresponding time delay, an answer of the at least one instantaneous question with a next instantaneous question and with the video stream on the plurality of user devices, such that the answer, the video, and the next instantaneous question are displayed in-sync on at least one of the plurality of user devices.

2. The method as claimed in claim 1, wherein the gaming application is executed simultaneously with the video stream of the live event.

3. The method as claimed in claim 1, wherein the at least one instantaneous question is an interactive multiple-choice question for which any choice is selected and submitted to the server correspondingly by the plurality of user devices.

4. The method as claimed in claim 3, wherein the submitted choice is rejected by the server if it is received beyond a predefined time window.

5. The method as claimed in claim 3, wherein the submitted choice is compared with the answer of the at least one instantaneous question for determining correctness of the submitted choice.

6. The method as claimed in claim 3, further generating a leader board by computing ranks of respective users of the plurality of user devices, the ranks being computed based on total number of correct choices submitted by the corresponding user device.

7. The method as claimed in claim 6, further comprising selecting at least one winner from the leader board by using a randomization technique.

8. The method as claimed in claim 1, further configuring a game log module for providing log of real-time interactions of the plurality of user devices for the at least one event.

9. The method as claimed in claim 1, wherein the submitted choice is evaluated for its correctness by using a third-party web server.

10. The method as claimed in claim 1, wherein the time delay is dependent upon at least one of the multiple factors including:
    geographical location of the plurality of user devices, and
    bandwidth allocated to a corresponding service provider to which any of the plurality of user devices is subscribed for receiving the video streaming of at least one live event.

11. A system for providing synchronization in an online gaming environment with video streaming of at least one live event, the system comprising:
    a plurality of user devices located at a plurality of geographical locations, each of the plurality of user devices executing a gaming application that is configured based on the at streaming of at least one live event;
    a server in communication with the plurality of user devices, the server configured to:
        stream the video of the at least one live event on each of the plurality of user devices, wherein the video stream is received on the plurality of user devices by a corresponding time delay,
        generate at least one instantaneous question based on at least one action occurring in the video stream of the at least one live event, synchronize, based on the corresponding time delay, the at least one instantaneous question with the video stream on the plurality of user devices, such that both the video stream and the at least one instantaneous question are displayed in-sync, wherein a program date time (PDT) extension is inserted in HLS (HTTP Live Streaming) manifest of the video stream for facilitating the synchronization of the live video stream with the online gaming environment, and wherein the inserted PDT extension is dynamically and periodically refreshable; and synchronize, based on the corresponding time delay, an answer of the at least one instantaneous question with a next instantaneous question and with the video stream on the plurality of user devices, such that the answer, the video stream, and the next instantaneous question are displayed in-sync on at least one of the plurality of user devices.

12. The system as claimed in claim 11, wherein the gaming application is executed simultaneously with the video streaming of the live event.

13. The system as claimed in claim 11, wherein the at least one instantaneous question is an interactive multiple-choice question for which any choice is selected and submitted to the server correspondingly by the plurality of user devices.

14. The system as claimed in claim 13, wherein the submitted choice is rejected by the server if it is received beyond a predefined time window.

15. The system as claimed in claim 13, wherein the submitted choice is compared with the answer of the at least one instantaneous question for determining correctness of the submitted choice.

16. The system as claimed in claim 13, further generating a leader board by computing ranks of respective users of the plurality of user devices, the ranks being computed based on total number of correct submitted choices by the corresponding user device.

17. The system as claimed in claim 16, further comprising selecting at least one winner from the leader board by using a randomization technique.

18. The system as claimed in claim 11, further configuring a game log module for providing log of real-time interactions of the plurality of user devices for the at least one event.

19. The system as claimed in claim 11, wherein the submitted choice is evaluated for its correctness by using a third-party web server.

20. The system as claimed in claim 11, wherein the time delay is dependent upon multiple factors including:
geographical location of the plurality of user devices, and
bandwidth allocated to a corresponding service provider to which any of the plurality of user devices is subscribed for receiving the video streaming of at least one live event.

21. The system as claimed in claim 11, further comprising a database configured in communication with the server for storing the data pertaining to the gaming application, and at least one action occurring in the at least one live event.

* * * * *